Feb. 7, 1967 H. P. LUDWIG 3,302,243
APPARATUS FOR THE INJECTION MOLDING OF PLASTIC
ARTICLES ESPECIALLY SHOES
Filed April 16, 1964 2 Sheets-Sheet 1

United States Patent Office 3,302,243
Patented Feb. 7, 1967

3,302,243
APPARATUS FOR THE INJECTION MOLDING OF PLASTIC ARTICLES ESPECIALLY SHOES
Herbert P. Ludwig, Desmastr. 112, Uesen, near Bremen, Germany
Filed Apr. 16, 1964, Ser. No. 360,364
5 Claims. (Cl. 18—30)

This invention relates to an apparatus for the injection molding of plastic articles, especially shoes, which consists of a mold carrier with various parts connected through joints, i.e., two mold carrier side plates, to one of which a cover is hinged and with insertable mold members and last receiver with insertable last, as well as injection head, and on which the mold transporting mold carrier members—mold receivers—may be closed tightly around a fixed last that is affixed to its mold carrier member, whereby both mold carrier side plates, when closed, are adjustable in relation to the mold carrier member of the fixed last.

It is the purpose of this invention to improve this above apparatus and especially to make is suitable for the injection molding of multi-colored objects, and to construct it in such a way that it can easily be fitted with an automatic control.

This invention is characterized in that it is possible to align the mold carrier with several (depending on how many colors are to be used) injection heads, and that the cover is fitted with a turning head which can be aligned to the various sized mold cavities at mold carrier side plates, whereby every mold cavity has a separate injection passageway which is independent from the others.

This aforementioned method makes it especially simple to use this apparatus for the injection molding of multi-colored objects, because while the mold carrier moves from one injection head to a second injection head that has material of different color, the cover may be opened either manually or automatically through a lever arrangement, the turning head may be turned and the cover closed again, and thus the mold cavity may be changed in size so that it is now possible to inject material of another color which combines with the material that had been injected first and already will have begun to plasticize partially.

This invention further suggests the turning head itself be constructed as a mold member by having various engravings. Thus exact fitting of different mold members to the injection head during production of various objects will be eliminated. In this manner only the turning head will have to be replaced. A preferred way of executing this invention is to have the rotation axis of the turning head parallel to the pivoting axis of the cover. This has the advantage that the cover will have to be enlarged in circumference comparatively little as compared to he cover of the apparatus which is to be improved.

The invention will now be described with reference to the accompanying drawings wherein.

Figure 1:
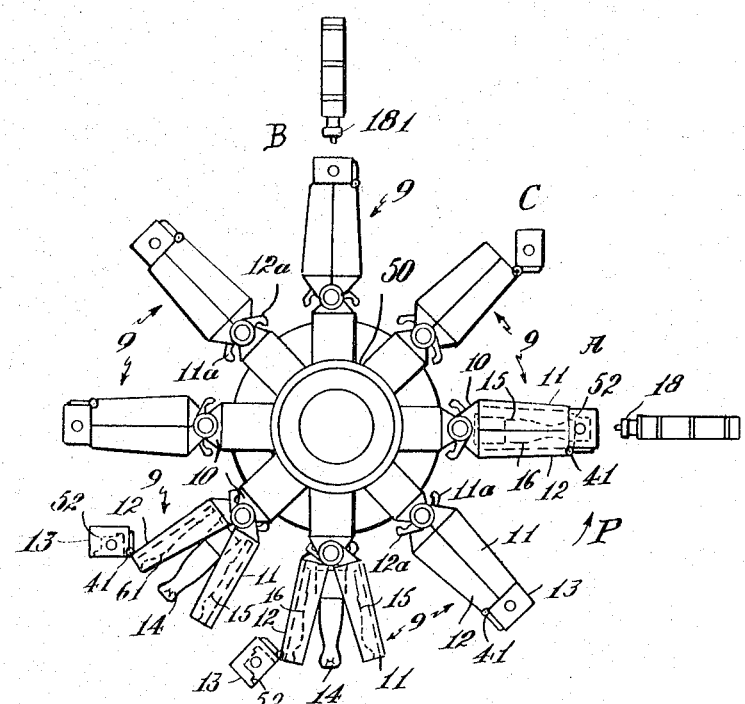
FIG. 1 is a plan view of an apparatus for injection molding of footwear showing a number of mold carriers mounted on a turntable movable successively relative to two injection heads for injection molding of two-color footwear.
Figure 2:
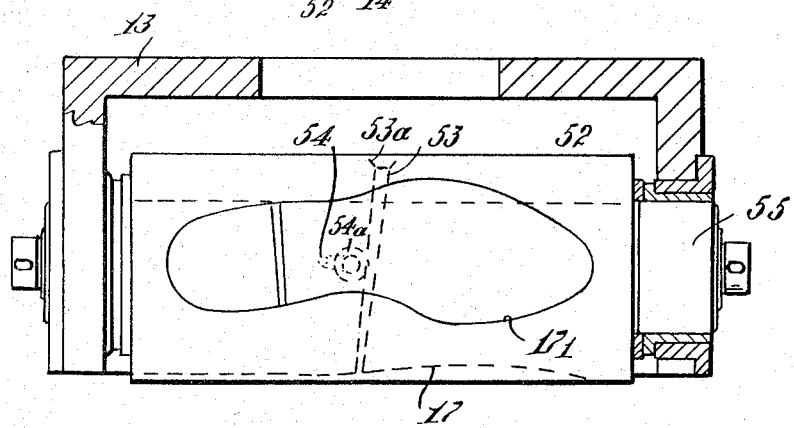
FIG. 2 is a cross-section taken on the line 2—2 of one of the mold assemblies shown in FIG. 1, to very much larger scale.

The apparatus has a turntable 50 on which there are several, for example eight, 9 mold carriers. These mold carriers 9 are moving towards two injection heads 18 and 18-1 within a cycle time, and in the direction of the arrow P. Every one of the mold carriers 9 consists of various parts 10, 11, 12, 13 that are connected to one another by movable joints.

Part 10 is the last receiver in which the last 14 is placed. Parts 11 through 13 are the mold receivers in which the mold members 15, 16, 17 are placed. The mold receiver consists of the mold carrier side plates 11 and 12, as well as the cover 13, and cover 13 is directed towards mold carrier side plates 11 and 12. The last 14 is connected rigidly with its mold carrier part 10 last receiver. Around the last 14 which is rigid the mold carrier parts 11 and 12 as well as cover 13 can be closed. Both mold carrier parts 11 and 12 when closed are adjustable through limit stops 11a and 12a in relation to the mold carrier part of the rigid last 14—last receiver—in such a way that the mold contact surfaces will be parallel to the axis of the last.

For the injection molding of multi-colored objects, as shown in the drawing for example, for molding of two color footwear, the mold carriers 9 are moved towards several, in this case 2, injection heads 18, 18-1. In injection position A the upper 51 is molded with black compound with injection head 18. The upper 51 is sealed off at bottom with a thin sole (insole) which is molded at the same time. For this purpose there is provided in the cover 13 a first mold 17 equipped with flat engraving.

To make injecting of an outer sole of different color possible in injection position B with injection head 18-1, a second mold 17-1 with deeper engraving in cover 13 is provided. For this purpose the cover 13 has a turning head 52. This turning head 52 portrays the two differing mold parts 17 and 17-1. These have to be brought in connection alternately with mold parts 15, 16 which form the mold cavity of mold carrier side parts 11 and 12. Both mold parts, 17 and 17-1 have injection passages 53 and 54 which are independent from each other. Each of the injection passageways has an injection inlet 53a and 54a to which injection heads 18 respectively 18-1 are set.

Turning head 52 is constructed as a mold member by using different kinds of engraving which constitute mold parts 17 and 17-1, as the drawing shows. It is also possible not to have these mold parts incorporated in the turning head, but produce them separately and fit them to the turning head as mold parts 15, 16 are fitted to mold carrier side plates 11 and 12. The rotation axis 55 of turning head 52 runs parallel to pivoting axis 41 of cover 13. The turning head may be moved manually or automatically around a lever arrangement. This drive is not part of this invention and therefore not shown in the drawing.

Figure 3:
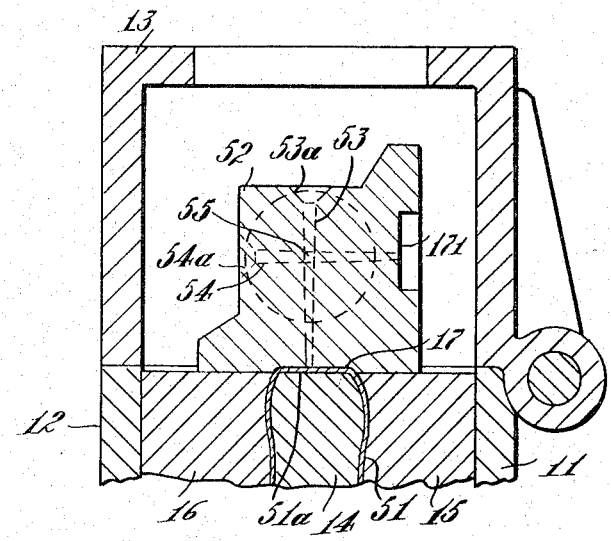
FIG. 3 is a horizontal section taken adjacent an outer end of one of the mold assemblies showing the rotatable turning head in one position for injection.
Figure 4:
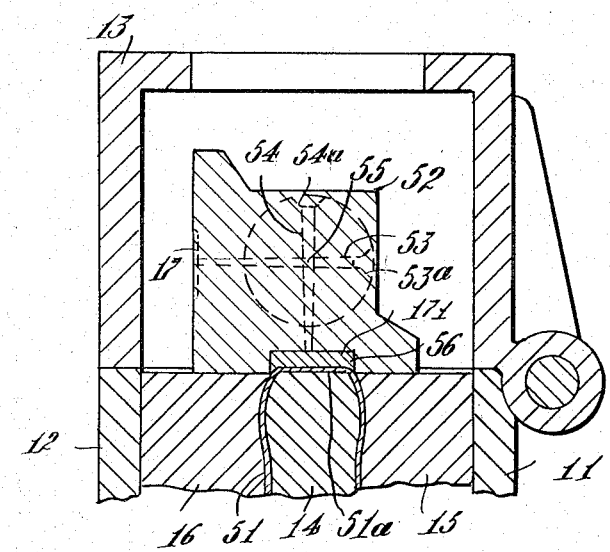
FIG. 4 is a corresponding section showing the turning head in another position for injection.

In injection position A the upper 51 with thin sole 51a is molded. For this purpose (as shown in FIG. 3), the turning head 52 with mold part 17 is brought before the last 14; it only leaves little space in between last 14, the space approximately equalling the thickness of the upper. The compound gets to the mold cavity by way of injection passage 53. After the upper 51 is finished the turntable 50 is moved further from one cycle in direction of arrow P and now cover 13 in position C is opened manually or automatically. In this position turning head 52 is then turned in such a way that now mold part 17-1 gets to be in front of last 14 as soon as cover 13 is closed again. See FIG. 4. Mold part 17-1 shows a cavity which will be big enough for outer sole 56 and heel. Cover 13 is then closed again. Within the moving cycle of turntable 50 the mold carrier 9 which was just described gets into injection position B opposite injection head 18–1. This injection head is being brought forward according to a known method and brought into connection with injection inlet 54a for mold part 17–1. Injection head 18–1 injects a compound of a different color, for example, blue or red to the upper which is not completely jelled yet and to the thin insole and thus outer sole 56 with heel is shaped. During the final jelling of the two plastic compounds of different colors they form a very good adhesion with each other.

The invention herein illustrated constitutes a modification of the invention illustrated in my copending application of even date.

It should be understood that the present disclosure is for the purpose of illustration only and that this invention includes all modifications and equivalents which fall within the scope of the appended claims.

I claim:

1. Injection molding apparatus for molding hollow plastic articles comprising, in combination, support means, a pair of side mold parts, means pivotally mounting one end of each side mold part on the support means, a form mounted on the support in a fixed position between said side mold parts, said side mold parts containing recesses which collectively form a cavity surrounding the sides of the form, an end mold part containing cavities of different depth, an end mold part support, one end of which is mounted on the distal end of one of the side mold parts for movement therewith toward the other side mold part and for pivotal movement following engagement of the side mold parts about the form, across the distal ends of the side mold parts, and means supporting the end mold part on the end mold part support for movement to a position thereon such that, when the end mold part support is disposed across the ends of the side mold parts, one of the cavities therein is opposite the distal end of the form, and is in communication with the cavity surrounding the form, said end mold part containing an injection passage through each of said cavities therein.

2. Injection molding apparatus according to claim 1, wherein the end mold part comprises a block having angularly disposed faces containing respectively said recesses of different depth, and means at the ends of the block supporting the block on the end mold part support for rotation about an axis parallel to said surfaces.

3. Injection molding apparatus according to claim 1, wherein the end mold part is a block, having angularly disposed flat surfaces for engagement with the distal ends of the side mold parts, said flat surfaces, respectively, containing said recesses of different depth, gudgeons at the ends of the block, the axes of which are parallel to the respective flat surfaces, said end mold support containing bearings in which the gudgeons are rotatably mounted, and means at the ends of the gudgeons by means of which the block may be rotated.

4. An injection mold comprising a first mold part containing a single cavity, a second mold part containing two cavities of different depth alternately positionable in confronting relation to the open end of the cavity in the first mold part, to form an article corresponding in dimensions to the cavity in the first mold part plus the cavity of lesser depth in the second mold part, and thereafter to form a layer on said article corresponding to the difference in depth of the cavities, means supporting the second mold part adjacent the open end of the first mold part for movement relative to the first mold part to strip the second mold part from the portion of the article formed therein, and means supporting the second mold part on said last means for movement relative to the cavity in the one mold part to move the cavity of lesser depth out of confrontation therewith and the cavity of greater depth into confrontation therewith.

5. An injection mold according to claim 4, comprising means supporting the second mold part for rotation about an axis parallel to the confronting open end of the cavity in the one mold part.

References Cited by the Examiner

UNITED STATES PATENTS

| 2,244,565 | 6/1941 | Nast | 18—30 |
| 2,333,059 | 10/1943 | Tucker | 18—30 |
| 3,128,505 | 4/1964 | Ludwig | 18—42 |

FOREIGN PATENTS

| 1,072,799 | 1/1960 | Germany. |

J. SPENCER OVERHOLSER, *Primary Examiner.*

W. L. McBAY, *Assistant Examiner.*